G. B. KINSLER.
UNIVERSAL JOINT.
APPLICATION FILED DEC. 4, 1917.

1,263,774.

Patented Apr. 23, 1918.

Inventor
J. B. Kinsler
By *[signature]*
Attorney

UNITED STATES PATENT OFFICE.

GEORGE B. KINSLER, OF HARTFORD, CONNECTICUT, ASSIGNOR TO THE KINSLER-BENNETT COMPANY, OF HARTFORD, CONNECTICUT, A CORPORATION OF CONNECTICUT.

UNIVERSAL JOINT.

1,263,774.

Specification of Letters Patent.

Patented Apr. 23, 1918.

Application filed December 4, 1917. Serial No. 205,396.

*To all whom it may concern:*

Be it known that I, GEORGE B. KINSLER, a citizen of the United States, residing at Hartford, in the county of Hartford and State of Connecticut, have invented certain new and useful Improvements in Universal Joints, of which the following is a specification.

This invention relates to universal joints. It is more or less common in an article of this character to provide a dust-guard comprising a cup which generally encircles one of the elements of the joint and which bears against the other. It is usual to hold this cup member in its operative position by spring means. One of the fundamental purposes I have in view is the provision of an abutment for the spring means which can be easily mounted in place and which can be held in active relation without the necessity of separate fastenings, thus insuring economy and as an incident readiness and ease of assemblage.

In the drawings accompanying and forming part of the present specification I have shown in detail a form of embodiment of the invention which I will set forth fully in the following description to enable those skilled in the art to practice the invention. I am not restricted, however, to this particular showing; I may depart therefrom in several respects within the scope of the invention defined by the claims following said description.

Referring to said drawings.

Like characters refer to like parts throughout the several figures which it will be perceived, are on different scales.

Figure 1:
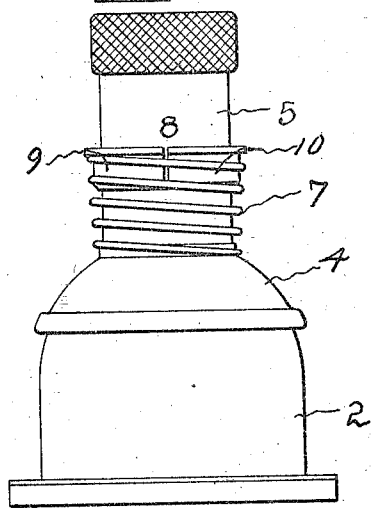
Figure 1 is an elevation of the joint.

The device comprises in its make-up two members such as those denoted in a general way by 2 and 3. These members are connected for relative universal movement. The part 2 has associated with it a dust-guard comprising the cup member 4 of practically spherical shape. The member 3 is equipped with a stem or shank 5 around which the reduced portion of the cup member 4 fits. The latter contains a packing ring 6 which hugs the member 2. This in fact is a concise description of a common type of universal joint with which my improvement can operate with advantage. As will be evident, this improvement can be used with utility in conjunction with other forms of joints.

Figure 2:
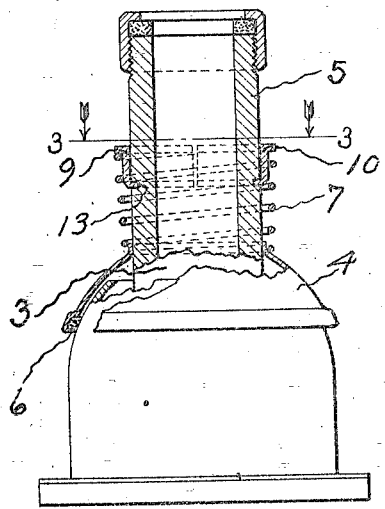
Fig. 2 is a practically similar view with a portion broken away and in section.
Figure 3:
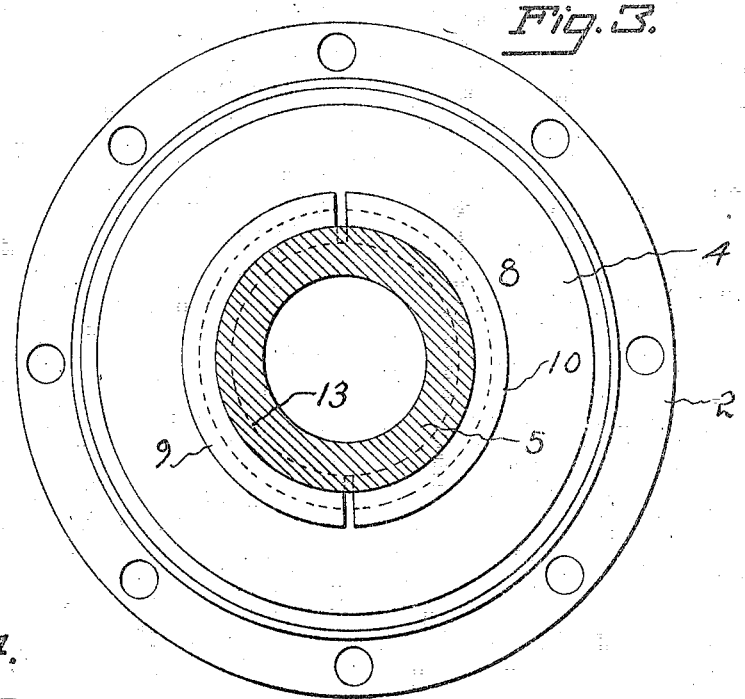
Fig. 3 is a transverse section on the line 3—3 of Fig. 2, looking in the direction of the arrows.
Figure 4:
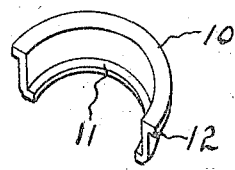
Fig. 4 is a perspective view of a portion of the abutment shown in the other views.

The cup member 4 is yieldingly held in its advanced relation to maintain the packing 6 at all times in proper contact with the practically spherical portion of the member 2 in some convenient way, the coiled spring 7 encircling the stem or shank 5, being shown for this purpose. The invention, as will be obvious, resides in the abutment for this spring or its equivalent. The abutment for the spring is denoted in a general way by 8 and as shown is in the form of a split ring surrounding the stem or shank 5 and associated therewith in a novel manner. This abutment or ring as shown is made up of two duplicate sections 9 and 10 wholly separate from each other, in view of which circumstance the parts 9 and 10 can be separately mounted or dismounted. Each of the sections 9 and 10 is provided along its inner forward side with a semi-annular flange or bead 11. In addition to this the same is provided with an outwardly extending bead or flange 12 along its rear side. The stem or shank 5 as shown has between its ends the circular channel or groove 13 which constitutes a seat for the divided ring or collar 8, the groove or channel being of a depth to properly receive the two flanges 11. When the parts of the ring 8 are in assembled relation with the stem or shank 5 as shown for illustration by Fig. 3, the ends of the sections of the ring are spaced or separated from each other a comparatively small distance. The two flanges 10 mate to present a stop to receive the outer end of the spring 7 as shown for illustration by both Figs. 1 and 2. At this time, as will be clear, the front portion of the spring hugs the neck part of the cup member 4 and acts against the cup member to hold it advanced and in yielding engagement with the joint member 2. It will be clear that the abutment or divided ring 8 is not in the ordinary sense fastened to the bearing member 3 of which the shank 5 forms a part.

It becomes a simple matter to operatively associate the several elements. It will be assumed that the parts 2 and 3 of the joint are assembled and that the cup member 4 is applied. In this event the coiled spring 7 will be passed over the stem or shank and the spring condensed or compacted from its outer end sufficiently to permit the mounting of the ring 8. When this is done the flanges 11 of the ring parts 9 and 10 will be inserted into the annular groove 13 and the ring parts will then fit closely or substantially against the stem. The spring 7 will now be released, so that it can expand to engage against the flanges 10 of the split or divided ring, these flanges 10 as will be clear, constituting an ample bearing for the spring.

It will be clear that the universal joint comprises two members, a cup to bear against one of the members, a spring acting against the cup, and an abutment for the spring, the other member having a bearing for the abutment, the spring acting to hold the abutment against its bearing. In view of this condition, it is of course, unnecessary to provide any independent or extraneous means to hold the ring or its equivalent in position. The ring acts as an effective abutment for the spring and the spring holds the abutment in position against accidental movement or withdrawal.

What I claim is:

1. A universal joint comprising two members, a cup to bear against one of the members, a spring acting against the cup, and an abutment for the spring, the other member having a bearing for the abutment, the spring acting as the sole means to hold the abutment against its bearing.

2. A universal joint comprising two members, a cup bearing against one of the members, a spring acting against the cup, and a multi-part ring, the other member being grooved to receive the parts of the ring and the ring being engaged by the spring, the spring holding the parts of the ring in the groove and the ring acting in turn as an abutment for the spring.

3. A universal joint comprising two members, a cup bearing against one of the members, a spring acting against the cup, and a multi-part ring, the other member having an annular groove, the parts of the ring having inwardly extending flanges to fit the groove and having outwardly extending flanges to be engaged by the spring, the spring holding the parts of the ring in the groove.

4. A universal joint comprising two members, a cup bearing against one of the members, the other member having a stem, a coiled spring surrounding the stem and bearing against the cup, and a multi-part ring around the stem, the latter having a groove and the sections of the ring being flanged to fit the groove, the ring having external means to be engaged by the spring and the spring holding the flanges of the sections of the ring in said groove.

5. A universal joint comprising two members, a cup bearing against one of the members, the other member having a stem, a coiled spring surrounding the stem and bearing against the cup, and a multi-part ring around the stem, the latter having a groove and the sections of the ring being flanged on their inner sides to fit the groove, the sections of the ring having external flanges to be engaged by the outer end of the spring and the spring holding the inner flanges of the sections of the ring in said groove.

In testimony whereof I affix my signature in the presence of two witnesses.

GEORGE B. KINSLER.

Witnesses:
 J. McV. JOHNSON,
 THEO. C. HUDSON, Jr.